(12) United States Patent
Schuesslburner (10) Patent No.: US 11,492,207 B2
(45) Date of Patent: Nov. 8, 2022

(54) DEVICE FOR GROUPING CONTAINERS

(71) Applicant: KRONES AG, Neutraubling (DE)

(72) Inventor: Helmut Schuesslburner, Straubing (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/291,988

(22) PCT Filed: Oct. 8, 2019

(86) PCT No.: PCT/EP2019/077188
§ 371 (c)(1),
(2) Date: May 6, 2021

(87) PCT Pub. No.: WO2020/094318
PCT Pub. Date: May 14, 2020

(65) Prior Publication Data
US 2022/0009723 A1    Jan. 13, 2022

(30) Foreign Application Priority Data

Nov. 8, 2018 (DE) .................... 10 2018 219 083.6

(51) Int. Cl.
*B65G 47/82* (2006.01)
*B65G 47/08* (2006.01)
*B65G 47/71* (2006.01)

(52) U.S. Cl.
CPC ......... *B65G 47/088* (2013.01); *B65G 47/715* (2013.01); *B65G 47/82* (2013.01); *B65G 2201/0244* (2013.01)

(58) Field of Classification Search
CPC ................. B65G 47/08; B65G 47/82
(Continued)

(56) References Cited

U.S. PATENT DOCUMENTS 3,392,852 A * 7/1968 Tegner ............... B65H 31/3081
414/790
3,418,895 A * 12/1968 Palmer .................. B65H 33/16
414/790
(Continued)

FOREIGN PATENT DOCUMENTS

EP         0659665 A1    6/1995
WO      2014195391 A1    12/2014

OTHER PUBLICATIONS

ISA European Patent Office, International Search Report Issued in Application No. PCT/EP2019/077188, Feb. 7, 2020, WIPO, 4 pages.
(Continued)

*Primary Examiner* — Douglas A Hess
(74) *Attorney, Agent, or Firm* — McCoy Russell LLP (57) ABSTRACT

The present invention provides a device for grouping containers, comprising a plurality of transfer pallets for conveying containers upright on a pallet surface and a first transfer device comprising a first transfer platform and an infeed manipulator, wherein the pallet surface of each transfer pallet has a plurality of ridge-like elevations forming a support surface for the containers, and wherein the first transfer platform has a comb-shaped outlet area configured for allowing the ridge-like elevations of the pallet surface to pass through the intermediate spaces of the comb-shaped outlet area for taking over the at least one container.

16 Claims, 6 Drawing Sheets

(58) Field of Classification Search
USPC .............................. 198/431; 414/790, 790.1
See application file for complete search history.

(56) References Cited

U.S. PATENT DOCUMENTS

| | | | | | |
|---|---|---|---|---|---|
| 3,479,932 | A | * | 11/1969 | Backman | B65H 33/16 |
| | | | | | 414/790 |
| 4,171,178 | A | * | 10/1979 | Birkenfeld | B65G 67/04 |
| | | | | | 414/790 |
| 4,189,270 | A | * | 2/1980 | Ehrlich | B65H 31/3054 |
| | | | | | 271/189 |
| 4,239,432 | A | * | 12/1980 | Richardson | B65H 31/30 |
| | | | | | 414/790 |
| 4,599,025 | A | | 7/1986 | Borsuk et al. | |
| 5,209,339 | A | * | 5/1993 | Antonissen | B65G 43/08 |
| | | | | | 198/817 |
| 5,529,167 | A | | 6/1996 | Gabriele | |
| 6,494,668 | B2 | * | 12/2002 | Baur | B65G 57/28 |
| | | | | | 414/789.2 |
| 6,543,989 | B1 | * | 4/2003 | Derenthal | B65G 47/647 |
| | | | | | 414/790 |
| 6,942,087 | B2 | * | 9/2005 | Meyer | B65H 31/3045 |
| | | | | | 198/468.9 |
| 8,911,199 | B2 | * | 12/2014 | Herrmann | B65H 31/10 |
| | | | | | 414/389 |
| 8,967,942 | B2 | * | 3/2015 | Torsten | B65G 57/303 |
| | | | | | 414/788.9 |
| 10,233,034 | B2 | * | 3/2019 | Philipp | B65G 47/647 |
| 10,633,195 | B2 | * | 4/2020 | Gadliger | B65G 47/57 |
| 10,807,805 | B2 | * | 10/2020 | Clucas | B65G 59/02 |

OTHER PUBLICATIONS

China National Intellectual Property Administration, Office Action and Search Report Issued in Application No. 201980081821.3, dated Jun. 6, 2022, 18 pages. (Submitted with Partial Translation).

* cited by examiner

DEVICE FOR GROUPING CONTAINERS

CROSS REFERENCE TO RELATED APPLICATIONS

The present application is a U.S. National Phase of International Application No. PCT/EP2019/077188 entitled "DEVICE FOR GROUPING CONTAINERS," and filed on Oct. 8, 2019. International Application No. PCT/EP2019/077188 claims priority to German Patent Application No. 10 2018 219 083.6 filed on Nov. 8, 2018. The entire contents of each of the above-listed applications are hereby incorporated by reference for all purposes.

TECHNICAL FIELD

The present relates to a device for grouping conveyed containers, e.g. bottles, in particular in a container treatment plant.

BACKGROUND AND SUMMARY

In container treatment plants, for example in the beverage industry, the containers to be treated are often redistributed or regrouped, so as to create e.g. a plurality of container flows or packs of containers that can be processed in parallel. For example, container conveyance between a labeling machine and a non-returnables packer for producing packs is carried out according to the following scheme: downstream of the labeling machine, the containers are usually conveyed in a single row, with defective containers being discharged from the container flow. After the containers have been decelerated by means of multiple speed reductions through the conveyor belts used, the single-row formation is broken up, so that a disordered mass transport occurs. From this mass transport, the containers are finally distributed by jostling into lanes and by the containers accumulating in the individual lanes, where a container pre-grouping takes place by means of a so-called container divider. The pre-grouped containers can subsequently be supplied to a non-returnables packer, so as to create packs of containers, for example, in the form of beverage crates.

However, the above-described method for distributing and grouping of containers has a large number of drawbacks with respect to process reliability. For example, there is a risk of tilting due to the fact that the reduction in speed of the containers through the conveyor belts involves friction. In the case of soft containers or sticky recycled PET containers, jostling into the lanes is also problematic, and non-pressure-resistant soft containers are generally difficult to convey under dynamic pressure. Furthermore, conveying the containers under dynamic pressure, as in the case of the above described disordered mass transport, often results in damage to the labels applied to the containers and is generally not feasible for specially shaped containers, such as rectangular PET containers or also soft cardboard containers. In addition, a changeover to a different container format is often inconvenient and error-prone, with long commissioning times having to be accepted due to the sometimes high complexity. Furthermore, the device described requires a lot of space and does not have sufficient buffer capacity.

In order to accomplish an improved buffer capacity, so-called linear axle gantry systems are used, which have pushing elements that are movable transversely and vertically to an incoming container flow, by means of which one or a plurality of rows of containers, also referred to as container lines hereinafter, is/are transferred from the infeed conveyor, e.g. a conveyor belt, transversely to the conveying direction of the infeed conveyor and thus onto a transverse conveyor, e.g. with a plurality of conveyor belts. By repeatedly transferring container lines onto the conveyor belts of the transverse conveyor, a large number of containers can be buffered temporarily, so as to be able to cope with temporary malfunctions of an upstream or downstream container treatment station, by way of example.

The above-mentioned linear axle gantry systems are here used as an infeed manipulator for taking over one or a plurality of container lines from a feed conveyor and as an outfeed manipulator for transferring one or a plurality of container lines to a discharge conveyor. One disadvantage of the buffer systems used, however, is that the buffered containers cannot be secured against toppling on the conveyor belt(s). Individual container rows or container lines cannot be manipulated independently of one another. In addition, the buffer function is realized by means of one of the infeed and outfeed manipulators in these systems. The buffer function contributes therefore substantially to the cycle time. This has a disadvantageous effect on the buffer size.

Also pallet circulation systems, in which groups of containers are conveyed by individual pallets, are frequently used for grouping and buffering containers. In this case, the pallets are driven, for example pulled, by a central pulling means, e.g. a chain, via couplings. Individual pallets can be stopped by means of external stoppers. Subsequent pallets then move onto the stationary pallets and come thus to a standstill.

It is therefore the object of the present invention to accomplish improved grouping of containers on their conveying path in a container treatment plant. Moreover, a compact buffer for the containers is to be provided. The device for grouping and buffering the containers should be flexibly adaptable to a change of container format. In addition, the conveyed containers are to be grouped gently and without toppling.

The above-mentioned objects are achieved by a device for grouping containers, comprising a plurality of transfer pallets, each configured for conveying at least one container upright on a pallet surface of the transfer pallets, and a first transfer device comprising a first transfer platform and an infeed manipulator configured to transfer containers from a feed conveyor onto the first transfer platform, wherein the pallet surface of each transfer pallet has a plurality of ridge-like elevations forming a support surface for the at least one container, and wherein the first transfer platform has a comb-shaped outlet area configured for allowing the ridge-like elevations of the pallet surface to pass through the intermediate spaces of the comb-shaped outlet area for taking over the at least one container.

The containers may be cans, glass bottles or other glass containers with lids, plastic bottles, made e.g. of PET, specially shaped containers, such as rectangular PET containers, containers made of cardboard or composite materials, e.g. tetrapack, or the like. In particular, containers of different sizes, cross-sections and/or weights can be grouped and buffered by means of the device according to the present invention.

The transfer pallets can convey one or a plurality of containers in an upright position. One or a plurality of containers may here be arranged in one or a plurality of rows on the pallet.

According to the present invention, a first transfer device comprising an infeed manipulator is provided, the infeed manipulator being configured to transfer containers from a feed conveyor onto the first transfer platform. The first transfer device is configured to provide containers from the feed conveyor for take-over by the transfer conveyor. The infeed manipulator may, for example, grasp the containers by means of suitably configured gripping elements and lift them over onto the transfer platform. Alternatively, the infeed manipulator may be equipped with one or a plurality of pushing elements, which push the containers from the feed conveyor onto the transfer platform. The feed conveyor may feed the containers in the form of a single-row or a multi-row infeed stream, and, for this purpose, it may in particular comprise one or a plurality of conveyor belts. In addition, diverters or dividers can be provided, by means of which a single-row infeed stream of containers can be divided into several rows. The containers may be fed in end-to-end contact, or they may be conveyed with a fixed pitch, i.e. with a fixed distance between successive containers.

As an alternative to the use of conveyor belts, the feed conveyor may use a long-stator linear motor for conveying the containers by means of individually movable conveying elements, so-called runners, movers or pucks. Long-stator linear motors are generally known in the prior art, so that a detailed description is dispensed with here. The conveying elements or runners generally comprise secondary parts having arranged thereon permanent magnets and/or electromagnets, which interact with the electromagnets of the long stator, thus exerting a force on the runners through which the runners can be moved along the respective conveying path with individual path-time profiles. Finally, the feed conveyor may also feed the containers by means of a conveyor chain.

As will be described in detail hereinafter, the infeed manipulator may be provided with a gantry system which, via linear axles, allows movement in a vertical direction, i.e. perpendicular to a support surface of the device, generally the floor of the hall, and movement in a horizontal direction, i.e. parallel to the support surface of the device, transversely to the conveying direction of the containers in the incoming container flow. For this purpose, the linear axles of the gantry system are provided with one or a plurality of motors, in particular servomotors, as known per se, which cause the movements in the two directions.

The infeed manipulator may additionally comprise one or a plurality of pushing elements by means of which the containers can be pushed from the feed conveyor onto the first transfer platform. Alternatively, the infeed manipulator may comprise one or a plurality of gripping elements by means of which the containers can be lifted off from the feed conveyor and deposited on the first transfer platform. The movement of the linear axles of the infeed manipulator is here controlled via a control and/or regulating unit of the device. The infeed manipulator may further comprise a long-stator linear motor with a plurality of conveying elements movable under individual control, which carry the pushing elements or the gripping elements. The long-stator linear motor may be configured to comprise one or a plurality of guide rails that are oriented parallel to the incoming container flow, so that the conveying elements, and with them the pushing elements or the gripper elements, can accurately be synchronized to the incoming container flow. After synchronization with the container flow, the pushing elements or the gripping elements of the long-stator linear motor can be guided from above to a position between the containers in the incoming container flow via the movement of the linear axles of the infeed manipulator, so that the containers can be transferred from the feed conveyor onto the first transfer platform by means of the pushing elements or the gripping elements.

For manipulating the containers in the incoming container flow, the gantry system can guide the long-stator linear motor with the conveying elements from top to bottom, and after the containers have been pushed onto the first transfer platform, it can guide the long-stator linear motor with the conveying elements from bottom to top. Here and in the following, the terms "top" and "bottom" are to be understood with respect to the gravitational field in the usual sense, i.e., generally with respect to a support surface of the device. Making use of a long-stator linear motor, it is possible, in particular, to selectively approach and separate individual containers in the incoming container flow, so that e.g. containers identified as defective can be omitted. It goes without saying that the infeed manipulator can also manipulate and transfer containers from multi-row infeed streams. In addition, the pushing elements or the gripping elements may be configured such that they can be changed over when the format of the containers is changed. For example, a pushing element and a counterholding element of the infeed manipulator may have provided between them movable spacers, which allow a change in container format by manual or automatic adaptation. A plurality of other variations of manipulators for transferring containers are known in the prior art and can be combined with the above described device as required.

According to the present invention, the first transfer platform defines a plane on which the containers transferred by means of the infeed manipulator are kept in an upright position ready for take-over by the transfer pallets described hereinafter. The containers may here stand especially in rows, i.e. container lines, on the transfer platform. The containers, in particular the container lines, can be shifted on the transfer platform, especially by means of the infeed manipulator. In this way, a plurality of container lines can be arranged on the transfer platform by means of the infeed manipulator, even from a single-row infeed stream. The infeed manipulator can here again be controlled by the control and/or regulating unit. The surface of the first transfer platform may in particular be formed from a material having a low frictional resistance, such as steel, aluminum, or some other metal or a metal alloy, so that the containers can be shifted across the surface of the transfer platform without toppling.

The first transfer platform may, in particular, be arranged in a stationary manner. Preferably, the first transfer platform is configured such that the surface of the transfer platform is oriented substantially horizontally. Here and in the following, a substantially horizontal orientation is to be understood as an orientation that deviates from the horizontal by less than 5°, preferably less than 2°, particularly preferred less than 1°. The horizontal plane is here defined by the gravitational acceleration as normal vector. A horizontal orientation of the first transfer platform minimizes the risk of tilting of the containers during manipulation by means of the infeed manipulator and the transfer conveyor described hereinafter.

According to the present invention, the pallet surface of each transfer pallet has a plurality of ridge-like elevations that form a support surface for the at least one container. The ridge-like elevations are here oriented parallel to one another, so that a comb-shaped cross-section of the transfer pallets perpendicular to the direction of movement is obtained. The ridge-like elevations may all have the same height, so that their upper edges form a flat support surface for the at least one container. However, individual ones of the plurality of ridge-like elevations may also have a greater height, in which case these higher elevations can provide lateral stability to the conveyed containers. In order to allow an easy change of the container format, only the elevations laterally delimiting the container line or a container group may be higher. Preferably, a sufficient number of juxtaposed ridges is always configured to have the same height, so that a change of container cross-section will easily be possible. In addition, the upper edge of each elevation may be straight in a longitudinal direction, so that a flat support surface will also be obtained in the longitudinal direction. Deviating from this, only a front and/or rear edge of the ridge-like elevations may be formed, which stabilizes the conveyed containers with respect to the direction of movement. With the exception of these front and rear edges, however, the upper edges of the ridge-like elevations form a flat support surface. The terms "front" and "rear" refer here and in the following to the normal direction of movement of the transfer pallets.

In accordance with the comb-shaped embodiment of the pallet surfaces of the transfer pallets, the first transfer platform has, according to the present invention, a comb-shaped outlet area configured for allowing the ridge-like elevations of the pallet surface to pass through the intermediate spaces of the comb-shaped outlet area for taking over the at least one container. In other words, the outlet area of the first transfer platform has the shape of a horizontal comb, the intermediate spaces between the parallel tines of this comb being arranged and configured in such a way that the ridge-like elevations of the pallet surface of the transfer pallets fit into the intermediate spaces of the outlet area. The transfer platform has thus an outlet area, which has the structure of a horizontally oriented comb. The width of the comb-shaped outlet area, i.e. its dimension in the direction of movement of the transfer pallets, corresponds at least to the maximum container diameter of the container formats to be grouped by the device. The dimension of the comb-shaped outlet area perpendicular to the direction of movement may correspond approximately to the corresponding dimension of the pallet surfaces. However, it is also conceivable that a plurality of transfer pallets are moved side by side by respective transfer conveyors, so that one or a plurality of container lines provided on the comb-shaped outlet area will be taken over by a row of transfer pallets moved side by side. In this case, the dimension of the comb-shaped outlet area perpendicular to the direction of movement is many times greater than the respective dimension of the individual transfer pallets.

The device may further comprise a transfer conveyor, in particular with a long-stator linear motor drive, which is configured to move the transfer pallets individually and independently of one another along a closed conveying path, wherein the first transfer device is arranged on the conveying path such that and the transfer conveyor and the plurality of transfer pallets are configured such that the ridge-like elevations of the pallet surface of the transfer pallets pass through the intermediate spaces of the comb-shaped outlet area, when the transfer pallets pass the first transfer platform.

It follows that, according to this embodiment, the transfer conveyor comprises, in addition to the plurality of transfer pallets, one or a plurality of suitable drives by means of which the transfer pallets are moved in a circulating manner along the closed conveying path. In particular, the transfer conveyor may comprise one or a plurality of long-stator linear motor drives by means of which the transfer pallets are moved along the conveying path individually and independently of one another, i.e. with individual path-time profiles. In this way, the transfer pallets can be moved systematically in the area of the comb-shaped outlet area for taking over one or a plurality of the container lines provided there, onto the pallet surface. Subsequently, the transferred containers are conveyed by means of the transfer pallets to a delivery point of the conveying path, of the type described in detail in hereinafter. Due to the individual path-time profiles of the movement of the transfer pallets, a desired buffer function of the transfer conveyor can here be realized. This buffer function is now independent of the cycle of the infeed manipulator and is only limited by the length of the transfer conveyor and by the number of transfer pallets.

Conveying systems with a long-stator linear motor drive are well known in the prior art. All the conveying systems with a long-stator linear motor drive have in common that conveying elements specially configured for this purpose, here the transfer pallets, are moved along one or a plurality of guide rails of the conveying path through magnetic interaction with the long stators or linear motor power trains of one or a plurality of linear motors. The conveying elements are here movably supported on the guide rail or guide rails, with rollers in particular being adapted to be used as low-friction bearing elements.

It follows that, when a long-stator linear motor drive is used for moving the transfer pallets of the transfer conveyor, the conveying elements, in particular the transfer pallets, and the conveying path will be configured such that the conveying elements can be moved by means of a magnetic force in interaction with the conveying path. For this purpose, the conveying path is provided with a magnetic linear drive including one or a plurality of long stators, e.g. in the form of a synchronous or asynchronous linear motor. To this end, the long stators are provided with a plurality of electric windings/electric coils in the form of individually controllable electromagnets. In order to generate a magnetic interaction between the transport element and the individually controllable electromagnets of the long stators, the secondary part of each transport element is generally provided with one or a plurality of permanent magnets or non-switching electromagnets and/or iron cores.

According to the embodiment of the transfer conveyor with a long-stator linear motor drive, each transfer pallet itself may have such a secondary part. Alternatively, separately configured runners with respective secondary parts may be provided, which drive the transfer pallets that are movably supported on the conveying path, by pushing or pulling them. For this purpose, the runners may be coupled to the transfer pallets mechanically or magnetically. The runners may, however, also be fixedly connected to the respective transfer pallets. In particular, the transfer conveyor may comprise at least one runner of the long-stator linear motor drive for each transfer pallet. In order to allow a stronger driving force or, as will be described in more detail hereinafter, a height adjustment of the pallet surface, a respective transfer pallet may have associated therewith in particular two or more runners that are movable independently of one another.

The movement of the transfer pallets, and in particular of the runners associated therewith, can be realized by a control and/or regulating unit of the transfer conveyor, e.g. by a central control unit and/or by control units arranged decentrally on the conveying elements. The one or the plurality of control units control and/or regulate here, as known per se, the electric windings of the long stators depending on the desired movement profile of the transfer pallets. It goes without saying that the transfer conveyor may comprise a plurality of conveying paths, which are arranged parallel to one another and which have respective suitable long stators, so as to allow a plurality of transfer pallets to be moved in parallel and independently of one another. In this way, a container line provided by the infeed manipulator can be divided into individual groups of containers assigned to respective transfer pallets.

Preferably, the conveying path of the transfer conveyor may be configured such that the transfer pallets for conveying the containers will be moved along an upper part of the conveying path, while the empty transfer pallets will be returned along a lower part of the conveying path. This kind of embodiment of the conveying path is particularly compact. However, it goes without saying that also alternative embodiments of the conveying path are possible, in particular in combination with the embodiments for taking over and transferring the containers by means of the pallet surfaces from the comb-shaped areas, these embodiments being described hereinafter. In addition, the transfer conveyor, in particular the conveying path, may be oriented transversely to a direction of movement of the containers in the infeed stream, and for example connect the infeed stream and an outfeed stream for container packs perpendicularly to each other. However, the present embodiment is not limited to such a perpendicular arrangement of the conveying path, but may comprise arbitrary orientations of the conveying path, as long as the transfer pallets are moved in the area of the first and second transfer platforms in such a way that the ridge-like elevations of the pallet surfaces can pass through the comb-shaped outlet and inlet areas of the transfer platforms. The conveying path, and consequently the respective guide rails and long stators, are thus oriented parallel to the tines of the respective combs in a projection in the horizontal plane in the area of the comb-shaped outlet and inlet areas of the transfer platforms.

A front edge of the comb-shaped outlet area of the first transfer platform may be oriented in particular perpendicularly to the direction of movement of the transfer pallets, when the transfer pallets pass the first transfer platform. In addition, the infeed manipulator may be configured and controlled such that, irrespectively of the container diameter, it will provide the containers such that their front edge will always be located at the same point of the comb-shaped outlet area, in particular at the front edge of the outlet area. If several container lines are provided, this will, of course, only apply to the foremost container line.

According to this embodiment, the ridge-like elevations of the pallet surface of the transfer pallets pass through the intermediate spaces of the comb-shaped outlet area, when the transfer pallets pass the first transfer platform, so as to take over the containers provided on the transfer platform. In other words, the transfer pallets, and thus their pallet surfaces, execute an oblique upward movement as they pass the first transfer platform, this upward movement causing the ridge-like elevations of the pallet surfaces to enter the intermediate spaces of the comb-shaped outlet area and raising them to such an extent that the upper edge of the ridge-like elevations will move beyond the surface of the transfer platform. A container that initially stands on the transfer platform will thus be lifted off from the transfer platform by the ridge-like elevations of the pallet surface and be taken over by the transfer pallet in this way.

According to a special embodiment, the transfer conveyor and the plurality of transfer pallets may be configured such that the pallet surface of the transfer pallets is oriented substantially horizontally when passing through the comb-shaped outlet area. This essentially horizontal orientation of the pallet surface can, as described hereinafter on the basis of illustrative embodiments, be accomplished by a special structural design of the guide rails of the transfer conveyor and/or the transfer pallets, in particular by the way in which the transfer pallets are supported on the guide rails. As has already been mentioned, essentially horizontal is to be understood here and in the following as within a maximum deviation of 5°, preferably 2°, particularly preferred 1° from the horizontal plane. In view of the fact that the pallet surface is horizontally oriented when passing through the comb-shaped outlet area, the containers provided on the outlet area can be taken over without any risk of toppling. In addition, the horizontal orientation of the pallet surface causes the pallet surface as a whole to pass through the intermediate spaces and beyond the surface of the transfer platform. In this way, a plurality of container lines provided one behind the other are taken over simultaneously by the transfer pallet.

In particular, each transfer pallet may comprise at least one front roller pair and at least one rear roller pair, the front roller pair and the rear roller pair being supported on different pairs of rails of the conveying path, and an arrangement of the front and of the rear roller pair relative to the pallet surface and relative to the pairs of rails being selected such that the pallet surface will be oriented substantially horizontally when passing through the comb-shaped outlet area. The conveying path, and consequently the transfer conveyor, thus has at least two pairs of guide rails on which the transfer pallets are movably supported with separate pairs of rollers. A pair of rails is to be understood here and in the following as a pair of corresponding guide rails, which are routed in parallel, in particular along the conveying path.

Because of their spatial distance in the direction of movement of the transfer pallet, the presence of the at least one front roller pair and the at least one rear roller pair allows the geometries of the front and rear pairs of rollers with respect to the pallet surface and the pairs of rails to be selected such that the pallet surface will be oriented substantially horizontally during the above-mentioned inclined travel through the comb-shaped outlet area.

For example, the pairs of rails may have a vertically offset, parallel section, so as to allow the pallet surface to pass through the comb-shaped outlet area. This means that the at least one front roller pair and the at least one rear roller pair run on vertically offset, sectionwise parallel guide rails in the area of the comb-shaped outlet area.

In addition, the pairs of rails may also be arranged such that they are vertically offset in a section subsequent to the passage of the pallet surface through the comb-shaped outlet area. This is particularly the case in the event that the rollers of the front roller pair and the rollers of the rear roller pair are located at different distances from the pallet surface. In this way, the pallet surface will remain horizontally oriented even after having passed through the comb-shaped outlet area and after having taken over the containers, so that the risk of toppling during conveyance to the delivery point will be minimized.

In addition, the pairs of rails may be arranged such that they are horizontally offset relative to one another. Especially, an inner pair of rails and an outer pair of rails may be provided, on which the front rollers and the rear rollers are supported, respectively. Pairs of rails arranged horizontally offset from one another allow the rails of the conveying path to extend horizontally after the pallet surface has passed through the comb-shaped outlet area. In this case, the rollers of the front roller pair and the rollers of the rear roller pair have the same distance from the pallet surface.

According to an alternative embodiment, each transfer pallet may comprise at least two front roller pairs and/or at least two rear roller pairs, which are each supported on a pair of rails of the conveying path such that they are movable under individual control, in particular by means of the long-stator linear motor drive, the transfer pallet being configured such that by changing the distance between successive front roller pairs and/or between successive rear roller pairs a position of the pallet surface relative to the horizontal can be changed. This can be accomplished e.g. by connecting the front and/or rear roller pairs via a respective scissor joint to a height-adjustable part of the transfer pallet comprising the pallet surface. The change in distance between successive roller pairs in the direction of movement of the transfer pallet can be accomplished by means of a motor, in particular a servomotor, which is controlled by a control and/or regulating unit depending on the position of the transfer pallet with respect to the first transfer platform. Alternatively, the successive roller pairs may be assigned to separate runners, or may at least be provided with secondary parts of their own, which allow an individual movement of the roller pairs towards or away from one another by means of the long-stator linear motor drive. By varying the distance between the successive roller pairs, the pallet surface can thus be tilted in a targeted manner with respect to the direction of movement of the transfer pallets, whereby in particular an inclined travel of the pallet surface in the area of the comb-shaped outlet area can be effected.

If at least two front roller pairs as well as at least two rear roller pairs are provided, the height of the pallet surface above a horizontally oriented conveying path, i.e. horizontally oriented guide rails, can flexibly be adjusted, so as to cause the pallet surface to pass through the comb-shaped outlet area. In the case of this particular embodiment, it is even possible to flexibly vary, by means of suitable control and/or regulation of the long-stator linear motor drive, the location on the pallet surface where the at least one transferred container comes to stand. This makes it possible, even in the case of a stationary comb-shaped inlet area of the second transfer platform, to put down individually transferred container lines in such a way that a plurality of container lines are combined.

It goes without saying that, instead of or in addition to the rollers, also other bearing elements, for example guide pins or friction bearings, may be used for realizing the movement of the transfer pallets and in particular of their pallet surfaces. The bearing elements are then movably supported on suitable guide elements of the conveying path, for example guide rails, guide channels or guide links.

The device may further comprise a second transfer device with a second transfer platform having a comb-shaped inlet area, the comb-shaped inlet area being configured such that and arranged on the conveying path such that the ridge-like elevations of the pallet surface of the transfer pallets are capable of entering the intermediate spaces of the comb-shaped inlet area for transfer of the at least one container, and the transfer conveyor being configured such that the ridge-like elevations of the pallet surface of the transfer pallets move, when passing the comb-shaped inlet area, down to a level below a surface of the second transfer platform for transfer of the at least one container. The second transfer device is configured for taking over containers from the transfer conveyor.

It follows that the second transfer device may be configured analogously to the first transfer device, the tines of the comb-shaped inlet area being oriented in a direction opposite to the direction of movement of the transfer pallets. Accordingly, the inclined travel of the pallet surface of the transfer pallets takes place at an oblique angle downwards, when the transfer pallets pass the comb-shaped inlet area, so as to deposit the conveyed containers on the surface of the second transfer platform. As for the rest, the same embodiments and variations of the first transfer device, in particular as regards the structural design of the second transfer platform and the pairs of rails and the bearings for the rollers of the transfer pallets, are correspondingly applicable to the second transfer device. Also the second transfer platform, in particular the comb-shaped inlet area, may be oriented substantially horizontally, so as to prevent the containers from toppling during transfer.

According to a special embodiment, at least the comb-shaped inlet area of the second transfer platform may be configured such that it is displaceable in the direction of movement of the transfer pallets. For example, the second transfer platform may be movably supported on guide rails by means of rollers in such a way that the front edge of the comb-shaped inlet area can be moved back and forth in the direction of movement. In this way, the point at which containers carried along by the transfer pallets are deposited can be varied. This allows container lines that are fed individually by the transfer pallets to be deposited close together on the second transfer platform. Alternatively or additionally, the transfer pallets may have, as described above, at least two front roller pairs and at least two rear roller pairs, the controlled change of distance between these roller pairs allowing the containers carried along to be deposited at a desired point of the comb-shaped inlet area.

The second transfer device may additionally comprise an outfeed manipulator configured for transferring containers in groups from the second transfer platform to a discharge conveyor. Here, the same variations and embodiments, which have been described above in connection with the infeed manipulator, may also be applied to the outfeed manipulator. In particular, the outfeed manipulator may comprise a linear axle gantry system according to the above description; suitably configured pushing elements or gripping elements may here be provided, by means of which the container groups can be transferred to the discharge conveyor. The outfeed manipulator can be controlled by means of the control and/or regulating unit in such a way that a manipulation of the group of container rows will be initiated only after a desired number of container rows has been provided on the second transfer platform. The discharge conveyor may comprise e.g. a conveyor belt.

As an alternative to delivering the containers carried along to the second transfer device, the transfer pallets may be forwarded, in the loaded condition, to a driverless transport system (DTS) or an automated guided vehicle (AGV). Driverless transport systems are generally known in the prior art, so that a detailed description is here dispensed with. The conveyor means of the driverless transport system are generally provided with a travel drive of their own and are automatically controlled and guided without contact. The pallets taken over by an DTS may be fed to a further treatment station for further treatment, e.g. for order picking and/or packaging. The DTSs may be configured such that they are able to take over transfer pallets on a plurality of vertical levels arranged one above the other. For this purpose, the DTSs may be provided with a height adjustment. Alternatively, the transfer conveyor may include diverters for selectively feeding out individual transfer pallets onto secondary paths that convey the transfer pallets to a higher level. The DTSs can thus also be used for storing transfer pallets as well as the containers conveyed thereby. Empty transfer pallets can be returned to the transfer conveyor by the DTSs on the same or a different level, either simultaneously or with an offset in time. In this way, idling of the transfer conveyor is avoided.

To make the transfer of transfer pallets to the DTSs as easy as possible, the transfer pallets may be decoupled from the runners of the transfer conveyor. Alternatively, the transfer pallets including the runners may be transferred to the DTSs.

The above-mentioned objects are also achieved by the use of one of the above-described devices for grouping containers, the use comprising: transferring at least one container line from the feed conveyor to the first transfer platform by means of the infeed manipulator, taking over the at least one container line from the first transfer platform by means of a transfer pallet in that the ridge-like elevations of the pallet surface pass through the comb-shaped outlet area of the first transfer platform, the at least one container line being in particular taken over such that the container line is aligned at a front edge of the pallet surface, and transferring the at least one container line to the second transfer platform by means of the transfer pallet in that the ridge-like elevations of the pallet surface move downwards through the comb-shaped inlet area of the second transfer platform. The transfer of the at least one container line by means of the infeed manipulator may, as described above, be carried out by means of suitable pushing elements or gripping elements of the infeed manipulator.

The transfer conveyor and the plurality of transfer pallets may, as described above, be configured such that the at least one container line is taken over in such a way that the container line is aligned at a front edge of the pallet surface. If the ridge-like elevations of the transfer pallets have a front edge, the at least one container line may be aligned at a rear flank with respect to the direction of movement of the transfer pallets. For this purpose, the rear flank may be inclined in accordance with the inclined travel of the pallet surface during transfer of the container line. A front flank of the front edge in the direction of movement may, however, be configured perpendicular to the pallet surface in order to push, when entering the comb-shaped inlet area of the second transfer platform, a container line already deposited there further in the direction of movement. In this way, the movement of the transfer pallet can create space on the second transfer platform for one or a plurality of additional container lines.

The at least one container line may also terminate with a rear edge of the ridge-like elevations, the rear edge having a stabilizing effect against toppling of the containers, when the container line is taken over from the first transfer platform. When the container line is transferred to the second transfer platform, the rear edge can cause the container line to be pushed further in the direction of movement across the second transfer platform. Also in this way, space can be created for subsequent container lines.

According to an embodiment, the use of the devices described may further comprise a temporary buffering of a plurality of container lines by means of the plurality of transfer pallets of the transfer conveyor. In particular, when a long-stator linear motor drive is used as part of the transfer conveyor, the transfer pallets loaded with containers can be moved along the conveying path of the transfer conveyor with variable path-time profiles. By suitably decelerating and grouping the transfer pallets, a buffer function of the transfer conveyor can here be realized, which can compensate for possible malfunctions in upstream and/or downstream treatment stations.

The described devices for grouping containers make it possible to control the manipulators in the inlet and the outlet with only one respective operation position. In view of the fact that the transfer as well as the removal of the containers by means of the manipulators takes place on a stationary surface of the respective transfer platform, the cycle times of the infeed and outfeed manipulators can be reduced. In contrast to the transfer to or removal from a driven conveyor belt, there is only a slight risk of toppling during the described manipulation of the containers.

The buffer function of the devices described takes place almost independently of the inlet and outlet systems or manipulators. Only the change of transfer pallets finds expression in the cycle time. For this reason, a more compact system can be built. The transfer pallets can be moved and controlled independently of one another due to the use of a long-stator linear motor drive. As a result, the transfer pallets can be moved along with a manipulator, for example during infeed, where the transfer pallets can be moved synchronously with the infeed manipulator independently of the rest of the pallet movements. In this way, a disadvantageous acceleration of the containers to be transferred can be avoided during transfer at the comb-shaped outlet area. The pallet width in the direction of movement can be selected such that a plurality of different container formats can be conveyed. Moreover, container conveyance by means of transfer pallets is pressureless and thus container friendly.

Additional features and exemplary embodiments as well as advantages of the present invention will be explained hereinafter in more detail with reference to the drawings. It goes without saying that the embodiments do not exhaust the scope of the present invention. It also goes without saying that a few or all of the features described hereinafter may also be combined with one another in a different way.

DETAILED DESCRIPTION

In the figures described hereinafter, like reference numerals stand for like elements. For reasons of clarity, like elements are described only when they appear first. However, it goes without saying that the variants and embodiments of an element described with reference to one of the figures can also be applied to the corresponding elements in the other figures.

Figure 1:
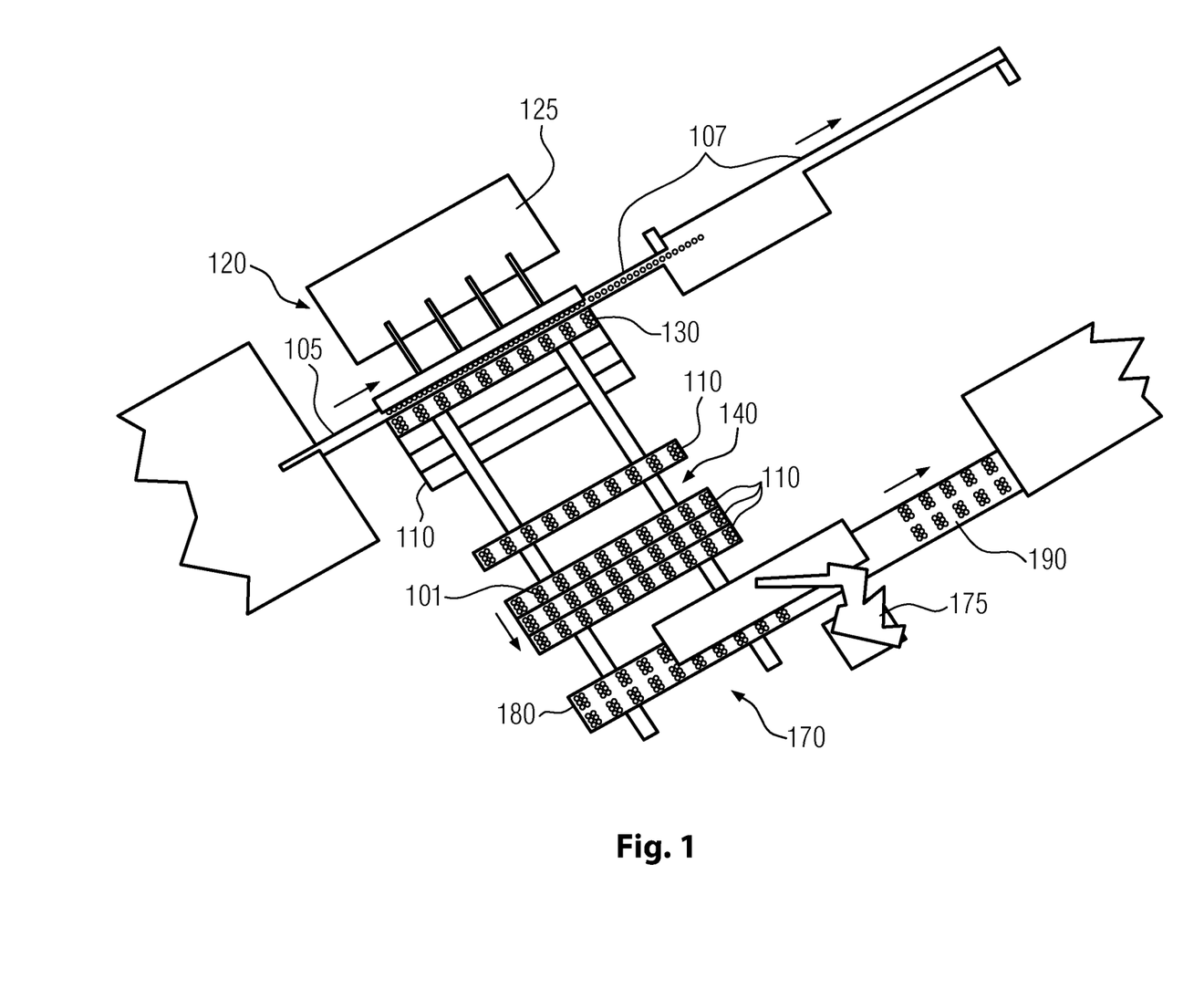
FIG. 1 shows an exemplary embodiment of a device for grouping containers according to the present invention in a perspective view.

FIG. 1 shows an exemplary embodiment of a device for grouping containers according to the present invention in a perspective view. From a part of a container treatment plant shown only schematically, the containers are conveyed to the area of the first transfer device 120 by means of a feed conveyor 105 configured as a conveyor belt. The first transfer device 120 comprises an infeed manipulator 125 with a linear axle gantry system, which pushes the incoming containers systematically from the conveyor belt of the feed conveyor 105 onto the first transfer platform 130 that is shown only schematically in FIG. 1. As described in more detail hereinafter, the infeed manipulator 125 may be configured such that it purposefully allows containers, which have been identified as defective, to pass, i.e. it pushes only non-defective containers onto the first transfer platform 130. According to the embodiment shown, the defective containers are discharged by means of a discharge conveyor 107 for further processing or recycling.

FIG. 1 additionally shows only schematically a downstream part of the container treatment plant to which the grouped containers, here in the form of packs, are fed by means of the discharge conveyor 190. Also the discharge conveyor 190 may be configured to comprise a conveyor belt. In the downstream part of the container treatment plant, the packs can be order-picked and packed on pallets for shipping.

According to the non-limiting embodiment shown, the inlet conveyor 105 and the discharge conveyor 190 have arranged between them a transfer conveyor 140, which is oriented perpendicular to the inlet flow and the outlet flow of the containers and which, making use of a plurality of transfer pallets 110, takes over the container lines pushed onto the first transfer platform 130 by the infeed manipulator 125 and conveys them to a second transfer device 170. Exemplarily, FIG. 1 shows a group of containers 101 on a transfer pallet 110, the group of containers being of the type that can be provided by the infeed manipulator 125 on the first transfer platform 130. However, it goes without saying that also continuous container lines may be conveyed on the transfer pallets 110.

The transfer conveyor 140 according to FIG. 1 is configured with a conveying path formed as a closed path in the vertical plane, the transfer pallets 110 traveling along the upper part of the conveying path in a loaded condition and being returned along the lower part of the conveying path in an empty condition. A plurality of transfer pallets is provided as a buffer in the inlet area to the first transfer device 120. FIG. 1 further shows that, due to the individual path-time profiles of the transfer pallets, which are achieved by means of the long-stator linear motor drive used, buffering of grouped containers is possible by guiding the transfer pallets on their way to the second transfer device 170 in closely spaced relationship.

Corresponding to the first transfer platform 130, also the second transfer device 170 has, according to the embodiment shown, a second transfer platform 180 on which the containers carried along by the transfer pallets 110 are deposited. An outfeed manipulator 175, shown here with gripper elements, takes over the grouped containers from the second transfer platform 180 and transfers them to the discharge conveyor 190.

Because of the buffer function of the transfer conveyor 140, the cycles of the infeed and outfeed manipulators can substantially be decoupled from the conveyance of the transfer pallets 110.

As an alternative to the second transfer device, the transfer pallets may be picked up by a driverless transport system (DTS) or an automated guided vehicle (AGV). The DTS/AGV may, for example, take over and store the transfer pallets in a plurality of planes, and it may, simultaneously or with an offset in time, deliver empty transfer pallets to the transfer conveyor 140.

Figure 2A:
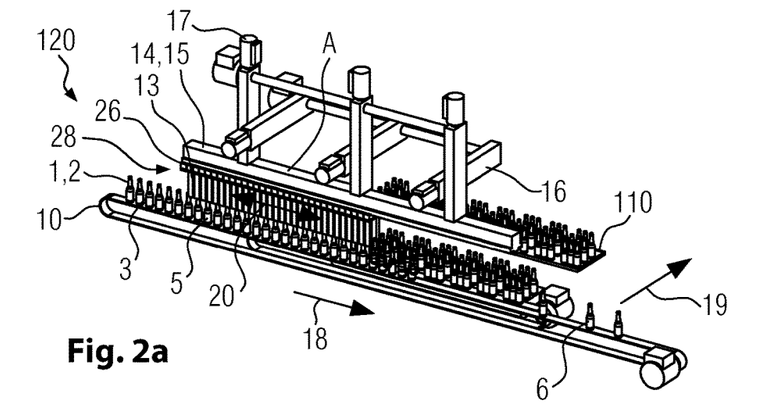
FIGS. 2a, 2b and 2c show a transfer device with an infeed manipulator according to the present invention.
Figures 2B, 2C:
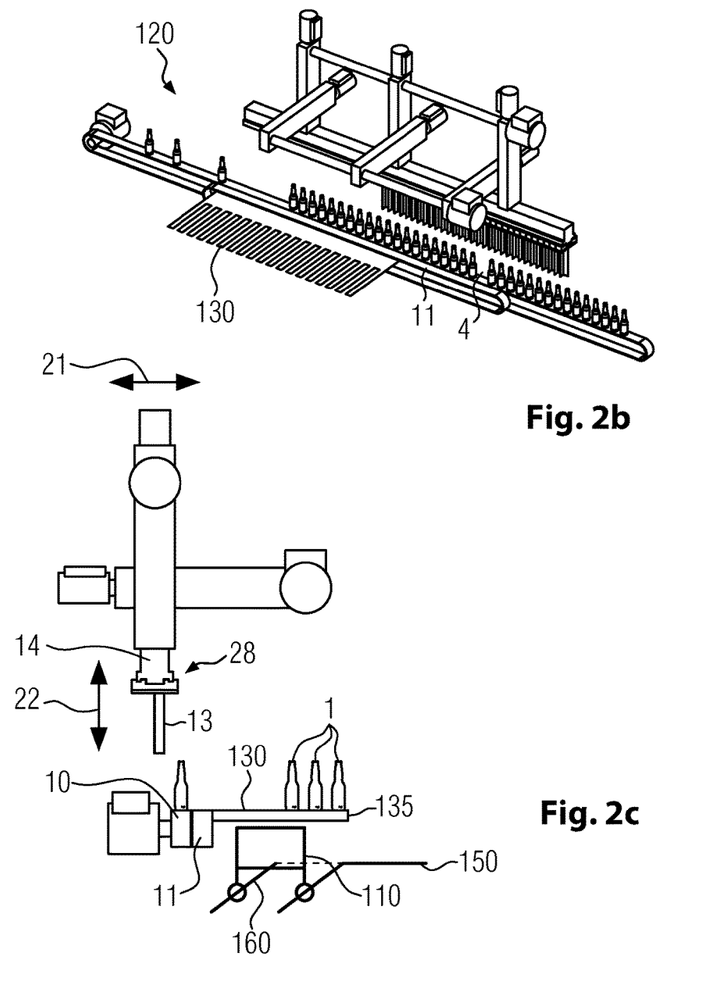

FIGS. 2a, 2b and 2c show an exemplary transfer device with an infeed manipulator according to the present invention. However, it goes without saying that also other infeed manipulators, which are known per se, may be used in combination with the transfer conveyor according to the present invention.

According to the embodiment shown, the transfer device 120 comprises a first conveyor belt in the form of an infeed belt 10, on which containers 1 of a container flow 2 are fed.

Individual containers 1 are separated from one another on the infeed belt by dividing gaps (a container pitch) 3. As shown in FIG. 2b, comparatively large undesirable gaps 4 may occur in the container flow 2 on the infeed belt 10, e.g. due to a loss of containers. On the other hand, a defective container to be discharged is identified by reference numeral 5 in FIG. 2a. Reference numeral 6 in FIG. 2a shows a defective container, which remains on the infeed belt 10 after the transfer shifting/grouping described hereinafter and which is consequently discharged. The containers 1 may simply stand on the infeed belt 10 or may be located on respective conveying elements/carriers.

Furthermore, the transfer device 120 comprises a second conveyor belt (intermediate belt) 11, a transfer platform 130 and a long-stator linear motor system A, which is arranged above the inlet belt 10, the intermediate belt 11 and the transfer platform 130 and which has movable shuttle elements 26 acting as a transfer shift unit 28 and comprising engagement elements (paddles) 13, a long-stator linear motor 14 and a rail system 15. The direction of movement 20 of the shuttle elements 26 corresponds to the conveying direction 18. The intermediate belt 11 may run at the same speed as and parallel to the infeed belt 10, and it may be part of the infeed belt 10, for example a broadened area thereof, or be formed separately from the infeed belt 10.

As will be described in more detail hereinafter, the transfer platform 130 comprises a comb-shaped outlet area onto which the containers are pushed by means of the infeed manipulator 125 comprising the long-stator linear motor system A. Containers, such as the container 6 in FIG. 2a, which are not manipulated by the engagement elements 13, remain on the infeed belt 10.

The long-stator linear motor system A can be moved, by means of a gantry system (Y-Z linear axle gantry system) 16, 17, vertically (in the z-direction; cf. reference numeral 22 in FIG. 2c) and transversely to the direction of movement (conveying direction) 18 of the infeed belt 10, i.e. in the y-direction 21 of FIG. 2c. The shuttle elements 26 including engagement elements 13 are arranged in succession on the rail system 15 and can be moved in or opposite to the conveying direction 18 by means of the long-stator linear motor 14. The engagement elements 13 serve to transfer selected containers 1 from the infeed belt 10 onto the intermediate belt 11 and the comb-shaped outlet area of the transfer platform 130, respectively.

Engagement of the engagement elements 13 in the container flow 2 of the containers 1 can take place from above (from the z-direction) and/or perpendicular to the conveying direction 18 (from the y-direction), and it can take place in such a way that, initially, there will be no contact with a container 1 on the infeed belt 10. For this purpose, the gantry system 16, 17 can move the long-stator linear motor A with the shuttle elements 26 in a suitable manner. The engagement can be controlled via a control unit of the transfer device 120, which is not shown.

By means of the long-stator linear motor A, the engagement elements 13 can be synchronized to the containers 1 to be manipulated, so that each container 1 to be manipulated has assigned thereto a shuttle element 26 with an engagement element 13. After synchronization, the containers 1 on the infeed belt 10 and the shuttle elements 26 of the long-stator linear motor system A move parallel to one another with the same speed and in the same direction.

For the purpose of transfer, the containers 1 are gripped by the engagement elements 13 and pushed from the infeed belt 10 transversely to the conveying direction, as indicated by arrow 19 in FIG. 2a, onto the intermediate belt 11. The containers pushed onto the intermediate belt can be further manipulated independently of the infeed belt 10. For example, containers coming in subsequently via the infeed belt 10 may overtake the containers, which have been pushed onto the intermediate belt 11, in the conveying direction 18.

The containers transferred to the intermediate belt 11 can, in turn, be decelerated by means of the engagement elements 13 by a movement of the shuttle elements 26 caused by the long-stator linear motor 14, or can be displaced in a direction opposite to the conveying direction 18, whereby closed container rows or container groups (grouped in the conveying direction 18) can be produced on the intermediate belt 11. In the case of comparatively large gaps 4 in the container flow 2 on the infeed belt 10, a closed container line can be formed on the intermediate belt 11 by means of two or more successive transfer operations (strokes).

By means of the shuttle elements 26 with the engagement elements 13, the containers transferred to the intermediate belt 11 can be transferred still further transversely to the conveying direction 18 onto the transfer platform 130 and, according to the present invention, in fact to such an extent that the containers will stand fully on the comb-shaped outlet area of the transfer platform. In particular, the containers can be advanced up to a front edge of the comb-shaped outlet area. For this purpose, the long-stator linear motor system A may, for example, be moved by the gantry system 16, 17 perpendicular to the conveying direction 18 (x-direction) in the y-direction. In particular, containers grouped in the conveying direction 18 can be transferred from the intermediate belt 11 to the transfer platform 130, as indicated in FIG. 1, or a row of containers 7 closed in the conveying direction 18 can be transferred from the intermediate belt 11 to the transfer platform 130. From the transfer platform 130, the containers can be taken over by the transfer pallets, as described hereinafter.

After the containers have been transferred from the intermediate belt 11 to the transfer platform 130, the long-stator linear motor system A, which comprises the long-stator linear motor 14, the rail system 15, the shuttle elements 26 with the engagement elements 13, is raised vertically (in the z-direction) by the Y-Z linear axle gantry system 16, 17 to a level on which the lower edges of the engagement elements 13 are located above the level of the upper edges of containers newly coming in on the infeed belt 10, and the shuttle elements are moved back to the starting position in a direction opposite to the conveying direction 18 and the y-direction, so that a new grouping operation can be carried out.

FIG. 2c also shows, in a schematic side view, the rail system of the transfer conveyor 140 with the pairs of rails 150 and 160. On these pairs of rails, the transfer pallets 110 are movable via separate pairs of rollers; due to the inclined arrangement of the pairs of rails, an inclined travel of the transfer pallet 110 in the area of the transfer platform 130 is caused in such a way that the pallet surface passes through the intermediate spaces of the comb-shaped outlet area 135 of the transfer platform 130.

The transfer device 120 shown in FIGS. 2a to 2c allows a reliable desired container grouping without any interruption of a subsequent flow of containers delivered on the infeed belt 10. The transfer device 120 may comprise more than one infeed belt 10 and/or intermediate belt 11, so that different types of containers can selectively be fed to the transfer platform 130. By means of the grouping on the intermediate belt 11, gaps 4 of an arbitrary size in the container flow 2 can be buffered on the infeed belt 10.

It follows that a respective container flow 2 with comparatively small pitch gaps 3 and comparatively large gaps 4, originating e.g. from lost containers, and with defective containers 6 can be processed in such a way that defective containers 6 on the infeed belt will be discharged without manipulation and grouped container formations will be provided on the transfer platform 130.

Figure 3A:
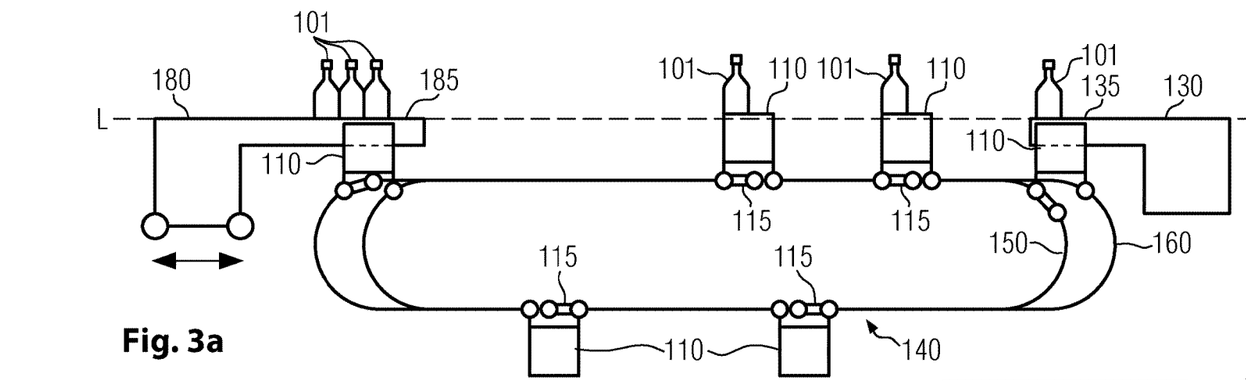
FIGS. 3a and 3b show a transfer conveyor with a plurality of transfer pallets according to the present invention in a side view and in a top view.
Figure 3B:
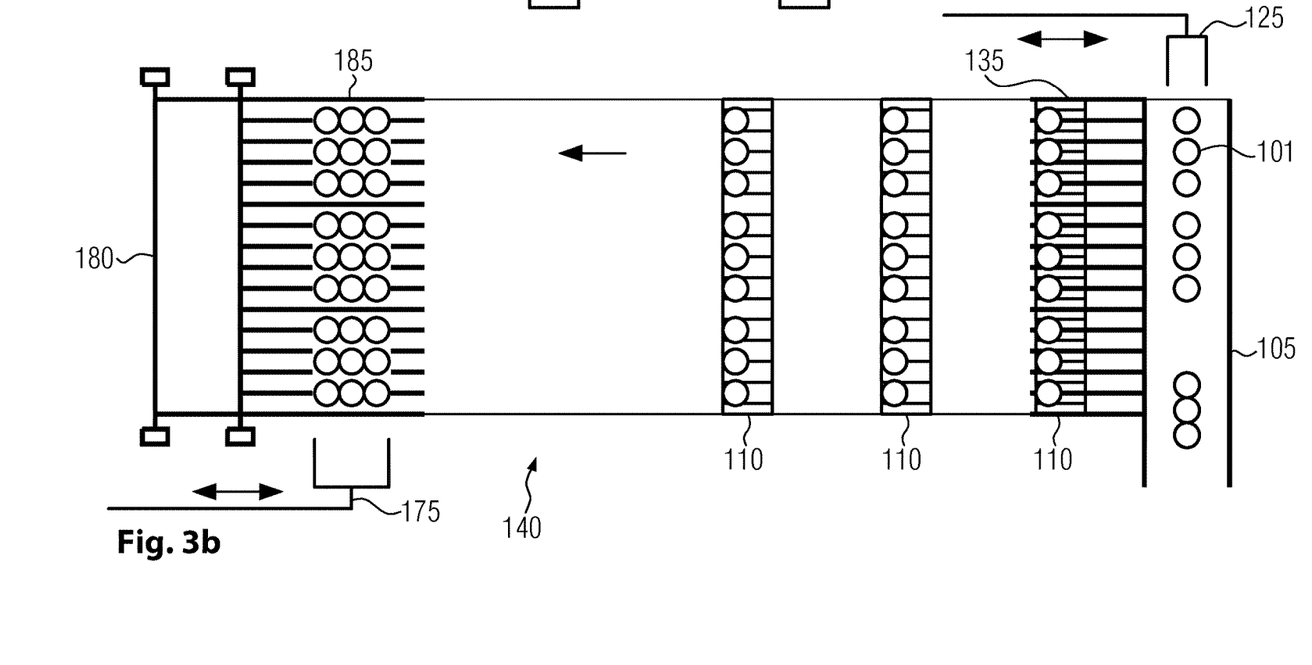

FIGS. 3a and 3b show a transfer conveyor with a plurality of transfer pallets according to the present invention in a side view and in a top view. The schematic side view of FIG. 3a shows a plurality of transfer pallets 110 driven by means of a long-stator linear motor drive (not shown) in a circulating manner along a perpendicularly oriented closed conveying path. In the upper part of the conveying path, the transfer pallets 110 are loaded with containers 101, the respective front of which is, in the exemplary embodiment shown, flush with the front edge of the pallet surface of the transfer pallets. The transfer pallets 110 are moved by means of runners 115 in magnetic interaction with the long stators according to desired path-time profiles. In the lower part of the conveying path, the empty transfer pallets 110 are guided back to the first transfer platform 130.

The conveying path of the embodiment shown is provided with two pairs of rails 150 and 160, which are arranged offset relative to each other in the area of the first transfer platform 130 and of the second transfer platform 180. As will be described in more detail hereinafter, the transfer pallets 110 have a front roller pair and a rear roller pair supported on a respective one of the pairs of rails 150 and 160, so that the offset arrangement of the pairs of rails provides a substantially horizontal orientation of the pallet surface during the inclined travel of the transfer pallets 110.

In the top view of FIG. 3b also the feed conveyor 105 can be seen, which feeds the containers, here already pre-grouped, in the form of an infeed stream. By means of the infeed manipulator 125 of the first transfer device, the containers 101 are transferred to the comb-shaped outlet area 135 of the first transfer platform 130, where they are provided for take-over by the transfer pallets 110. The comb-shaped outlet area 135 of the first transfer platform 130 as well as the comb-shaped inlet area 185 of the second transfer platform 180 have a plurality of parallel tines, into the intermediate spaces of which suitably configured ridge-like elevations of the transfer pallets 110 can enter, as shown in FIG. 3b.

Due to the vertical movement of the pallet surface of the transfer pallet 110 in the area of the comb-shaped outlet area 135, the ridge-like elevations of the pallet surface pass through the intermediate spaces of the comb-shaped outlet area until the containers 101 provided on the first transfer platform 130 are lifted off from the transfer platform and taken over. In FIG. 3_a_, the height level of the first and second transfer platforms is exemplarily shown by a dashed line L-L. However, it is not absolutely necessary that the surfaces of the first and second transfer platforms are on the same level. Depending on the structural design of the conveying path, i.e. the guide rails, of the transfer conveyor 140 between take-over and transfer of the containers 101, the first and the second transfer platform may also be on different levels. FIG. 3_a_ shows, for demonstrating the present invention, an arrangement of the conveying path between take-over and transfer of the containers 101, in the case of which the pallet surface of the transfer pallets 110 is always above the height level L-L.

In the reverse procedure to the taking over of the containers 101 from the comb-shaped outlet area 135 of the first transfer platform 130 by the pallet surface of the transfer pallets 110, the containers 101 carried along are deposited on the second transfer platform 180 by a downward movement of the pallet surface through the comb-shaped inlet area 185 of the second transfer platform 180. In the representation according to FIG. 3_a_, three container lines 101 have already been deposited closely together on the second transfer platform 180. In the embodiment shown, this is made possible, without adapting the guidance of the pallet surface of the transfer pallets, by a displaceability of the second transfer platform 180 in the direction of movement, as indicated in the figure by the double arrow. In this way, a grouping of the container lines on the second transfer platform 180 is accomplished. By means of an outfeed manipulator 175, of the type schematically indicated in FIG. 3_b_, the grouped container lines can be taken over from the second transfer platform 180 and fed to a discharge conveyor. Subsequently, the grouped container lines may e.g. be order-picked and/or packed by means of suitable treatment stations.

Figure 4:
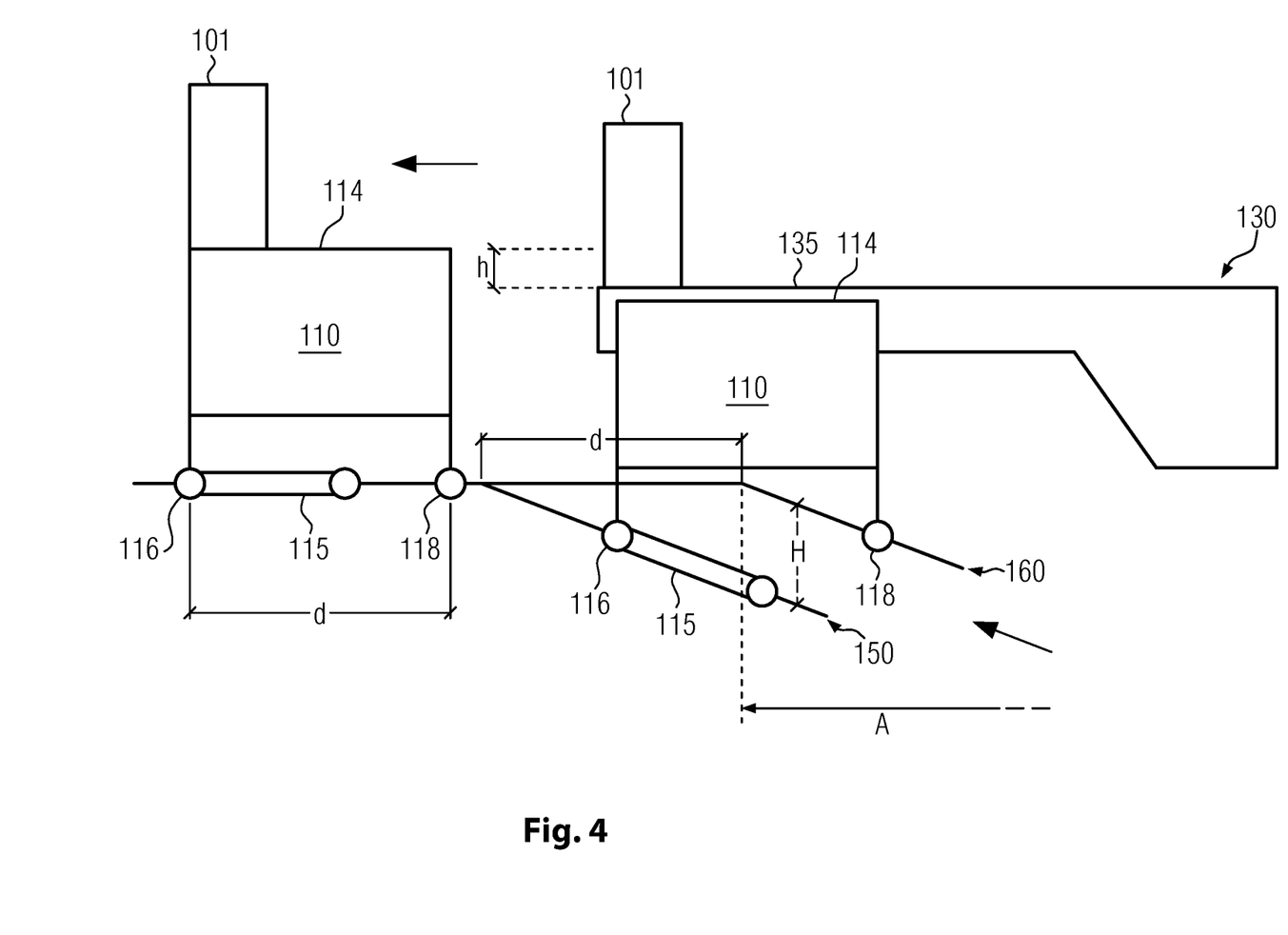
FIG. 4 schematically shows the transfer of a container from the first transfer platform with a rail system according to a first embodiment.

FIG. 4 schematically shows the taking over of a container from the first transfer platform with a rail system according to a first embodiment. The container 101 is here shown schematically. In the non-limiting embodiment shown, the container 101 has been provided on the transfer platform 130 in such a way that its front is substantially flush with a front edge of the comb-shaped outlet area 135. From there, the container is taken over by means of the support surface 114 of a transfer pallet 110, this support surface 114 being defined by the comb-shaped pallet surface.

According to this embodiment, the rail system of the conveying path of the transfer conveyor has two pairs of rails 150 and 160, which have a vertically offset, parallel section A, so as to allow the pallet surface to pass through the comb-shaped outlet area. In this section, rails of the pairs of rails 150 and 160 corresponding to each other are arranged such that they are offset by the height H in a vertical direction, the corresponding rails being parallel. In the embodiment according to FIG. 4, the rails are straight in the area of inclined travel of the transfer pallet 110. However, it goes without saying that the rails may also be curved, corresponding rails of the pairs of rails 150 and 160 being also in this case guided parallel to each other.

According to the first embodiment, the transfer pallet 110 has a front roller pair 116 and a rear roller pair 118, which are spaced apart from one another in the direction of travel by the distance d, as indicated in the figure. Depending on this distance d, the height offset H can be selected such that the support surface 114 of the pallet surface will be oriented horizontally when passing through the comb-shaped outlet area 135, as shown in the figure. In this way, the containers 101 provided on the transfer platform 130 can be transferred as smoothly as possible, thus minimizing the risk of toppling. In this case, the ascending area of the guide rails 150 and 160 is arranged with respect to the comb-shaped outlet area 135 in such a way that the ridge-like elevations of the pallet surface of the transfer pallet 110 will enter the spaces between the tines from below, the upper edge of the ridge-like elevations protruding finally beyond the surface of the transfer platform 130 by a height h. The transferred containers 101 are thus raised by this height h during the inclined travel of the transfer pallets. For better illustration, a ridge-like elevation of the transfer pallet is shown outside the comb-shaped outlet area in FIG. 4. This is, however, not absolutely necessary and can be adapted depending on the position which the containers to be taken over occupy on the transfer platform.

In the embodiment shown, the transfer pallets 110 are moved by means of a runner 115, which is driven through magnetic interaction with the long stator or the long stators. In the embodiment shown here, the runner is supported via rollers on the first pair of rails 150. Alternatively or additionally, however, a runner may also be supported on the second pair of rails 160. The runners shown are mechanically coupled to the transfer pallets and share the front roller pair 116. Again, this is not absolutely necessary, since the runners may also be in mechanical engagement with a suitably configured part of the transfer pallets and may push or pull the latter. Finally, the runners 115 may also be arranged on rails of their own.

After the pallet surface has passed through the comb-shaped outlet area 135, the transfer pallets 110 travel in a plane in the case of the embodiment shown here. In this case, both pairs of rails 150 and 160 extend in this plane. The plane may, in particular, be oriented horizontally. By arranging the front roller pair 116 and the rear roller pair 118 at an identical vertical distance from the support surface 114, it can be achieved that the containers 101 are conveyed on a substantially horizontally oriented pallet surface also during further conveyance along the transfer conveyor.

According to the present disclosure, the area of passage through the comb-shaped outlet or inlet area is to be understood, in particular, as the rail area along which the pallet surface lies within a distance of at most 5 cm below and at most 10 mm, preferably at most 5 mm, above the surface of the transfer platform 130. However, the area of passage can also be extended to the rail area along which the pallet surface, more precisely the support surface thereof, is at least partially located in the intermediate spaces of the comb or above the surface of the transfer platform.

The structural design of the second transfer platform 180, in particular the relative arrangement of the guide rails of the transfer conveyor with respect to the comb-shaped inlet area 185, can, in accordance with the embodiment of FIG. 4, be selected accordingly in such a way that the support surface 114 with the container 101 carried along is oriented substantially horizontally, when it moves down through the comb-shaped inlet area 185.

Figure 5:
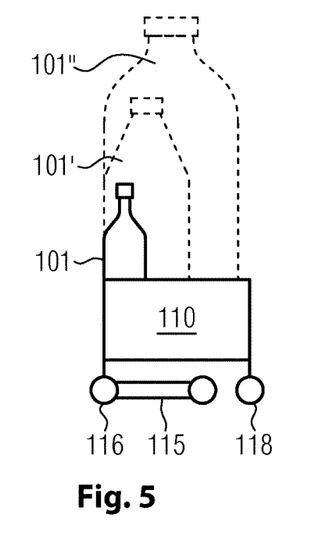
FIG. 5 shows a side view of a transfer pallet with an associated runner.

FIG. 5 shows a side view of a transfer pallet with an associated runner. Again, the runner 115 is mechanically coupled to the transfer pallet, with the transfer pallet 110 and runner 115 sharing the front roller pair 116. The width of the transfer pallet 110 in the direction of movement, to be exact the width of the support surface 114, can be selected such that all container formats 101, 101' and 101" to be conveyed by the device can be accommodated on the support surface. As has already been mentioned, the containers can be taken over from the comb-shaped outlet area in such a way that their front is aligned as flush as possible with a front edge of the transfer pallet 110, as indicated in FIG. 5. This allows the containers carried along to be deposited on the second transfer platform without coming into contact with containers that are already present there. In this way, the containers can be placed close together on the second transfer platform.

Figure 6:
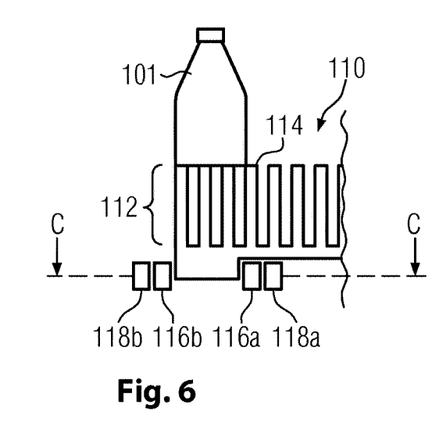
FIG. 6 shows the transfer pallet according to FIG. 5 in a rear view.

FIG. 6 shows the transfer pallet according to FIG. 5 in a rear view. In this rear view, the comb-shaped configuration of the pallet surface 112 of the transfer pallet 110 is shown schematically. The ridge-like elevations of the pallet surface 112 have here the same height, so that a flat support surface 114 for the container 101 is formed. In FIG. 6, only the left part of the transfer pallet 110, which is normally comparatively long in a transverse direction, is shown exemplarily. In addition, the rollers 116a and 116b of the front roller pair and the rollers 118a and 118b of the rear roller pair are visible in the view shown. With reference to the embodiment of the rail system according to FIG. 4, the rear view of FIG. 6 thus shows a horizontally traveling transfer pallet 110.

Figure 7:
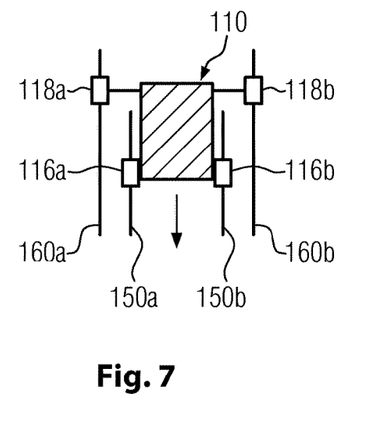
FIG. 7 shows the roller pairs of the transfer pallet and the rail pairs of the transfer conveyor in a top view.

In FIG. 7, the roller pairs of the transfer pallet 110 and the pairs of rails the transfer conveyor are shown in a top view of the plane represented by the dashed line C-C in FIG. 6. It can be seen that the rails 150a and 150b of the first pair of rails 150, on which the front rollers 116a and 116b are arranged, are located inside the rails 160a and 160b of the second pair of rails 160, on which the rear rollers 118a and 118b are arranged. According to the embodiment shown, the pairs of rails 150 and 160 are thus arranged horizontally offset from one another. This allows the transfer pallets 110 shown in FIG. 4 to travel horizontally in a simple manner.

Figure 8:
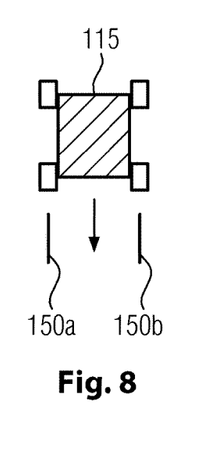
FIG. 8 shows a runner, including a pair of rails associated therewith, in a top view.

FIG. 8 shows a runner 115, including the pairs of rails 150a and 150b associated therewith, in a top view. This runner 115 may, for example, be fully arranged below the transfer pallet 110 shown in FIG. 7. According to the embodiment shown, the runner 115 moves on the rails 150a and 150b of the pair of rails 150 on which also the front rollers 116a and 116b of the transfer pallet are supported. However, as has already been mentioned, also separate rails may be provided for the runner 115.

Figures 9, 10:
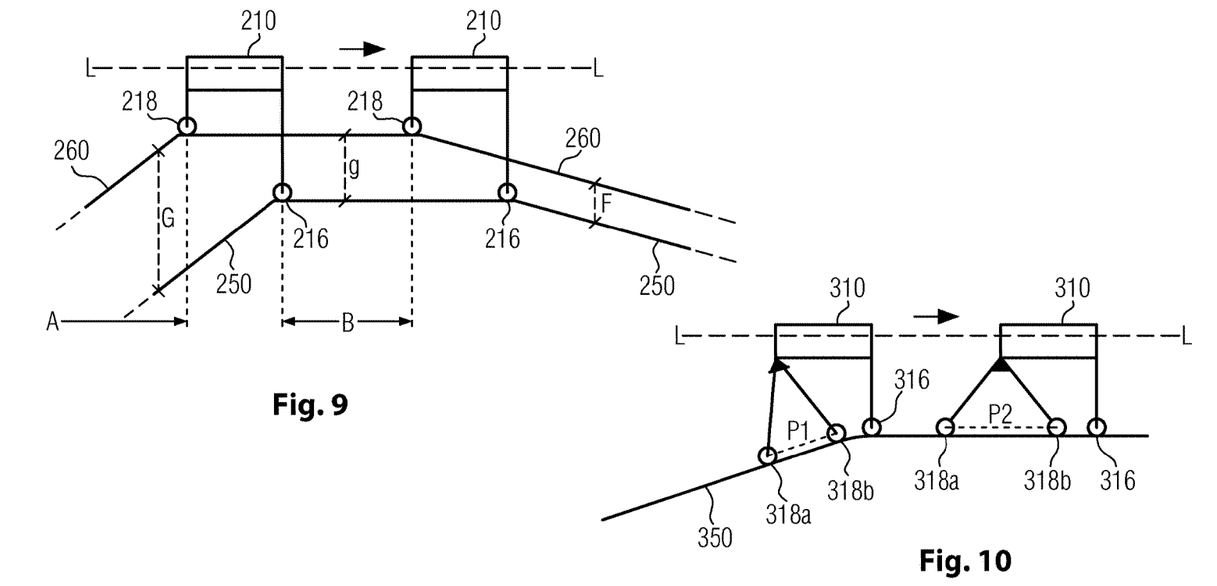
FIG. 9 shows transfer pallets with an associated rail system according to a second embodiment.
FIG. 10 shows transfer pallets with an associated rail system according to a third embodiment.

FIG. 9 shows transfer pallets with an associated rail system according to a second embodiment. As in FIG. 3a, a height line L-L is shown as a dashed line, so as to provide a reference for the level of the surface of the first and/or second transfer platforms. Also in this case, the transfer pallets 210 are supported on a first pair of rails 250 by means of a front roller pair 216 and on a second pair of rails 260 by means of a rear roller pair 218. FIG. 9 shows the routing of the two pairs of rails 250 and 260 for both the inclined travel for taking over the containers and the inclined travel for delivering the containers. Also in this embodiment, the pairs of rails 250 and 260 are arranged such that they are vertically offset from each other for allowing the pallet surface to pass through the comb-shaped outlet area and the comb-shaped inlet area, respectively. While the height offset G is comparatively large, when the pallet surface passes through the comb-shaped outlet area 135 in the rail area A, the height offset F is comparatively small, when the pallet surface passes through the comb-shaped inlet area 185. For better understanding, the height offsets are exaggerated in FIG. 9 and can be adjusted according to requirements.

In the embodiment shown, the difference between the height offsets G and F results from the front roller pair 216 having a greater vertical distance from the pallet surface of the transfer pallets 210 than the rear roller pair 218. It goes without saying that the structural design may also be the other way round, in which case the pairs of rails 250 and 260 are arranged accordingly. Because of the different distances from the pallet surface, the pairs of rails 250 and 260 are arranged such that they are vertically offset also in a section B subsequent to the passage of the pallet surface through the comb-shaped outlet area, so as to allow a substantially horizontal orientation of the pallet surface during horizontal travel. The vertical offset g between the pairs of rails is, in the area B, between the height offset F and the height offset G and is given by the difference in the distances of the roller pairs from the pallet surface. In the embodiment according to FIG. 9, a horizontal offset of the pairs of rails 250 and 260 is not necessary.

FIG. 10 shows transfer pallets with an associated rail system according to a third embodiment. According to the third embodiment, the transfer pallets 310 have, in addition to the front roller pair 316, two rear roller pairs 318a and 318b, which are supported on the pair of rails 350 such that they are movable under individual control, in particular by means of the long-stator linear motor drive. In particular, the roller pairs 318a and 318b may be assigned to a respective separate runner of the long-stator linear motor drive or have secondary parts of their own. By means of suitable path-time profiles in the area of passage through the comb-shaped outlet area of the transfer platform, the surface of which is again indicated by the dashed line L-L, the distance between successive rear roller pairs 318b and 318a can be increased from p1 to p2, as indicated in FIG. 10.

In view of the fact that the rear roller pairs 318a and 318b are supported on the transfer pallet 310 via a scissor joint, this change of the distance p leads to a change in the height of the pallet surface above the guide rail 350. A substantially horizontal orientation of the pallet surface can thus be achieved, depending on the slope of the guide rail 350, which is here shown as a curved rail. Even without providing a further pair of rails, a substantially horizontal passage of the pallet surface through the comb-shaped outlet and inlet areas of the transfer platforms can be accomplished in this way. In particular, the embodiment shown does not necessitate the use of vertically offset pairs of rails and can thus be configured to be more compact.

Figure 11:
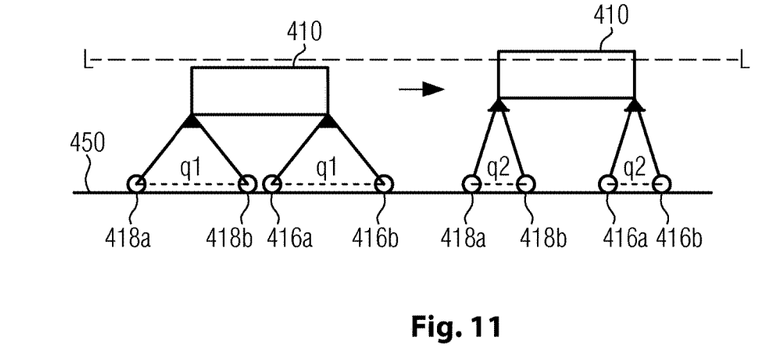
FIG. 11 shows transfer pallets with an associated rail system according to a fourth embodiment.

Finally, FIG. 11 shows transfer pallets with an associated rail system according to a fourth embodiment. According to this embodiment, the transfer pallets 410 comprise also two front roller pairs 416a and 416b, whose distance q, just as the distance of the rear roller pairs 418a and 418b, can be reduced from $q_1$ to $q_2$ according to requirements. Also in this case, the roller pairs are supported on the transfer pallets 410 via respective scissor joints. By reducing the distance q between successive roller pairs, the height of the pallet surface of the transfer pallet 410 can, as indicated in FIG. 11, be raised above the level of the surface of the transfer platform, again indicated by the dashed line L-L. By simultaneously adjusting the distance between successive front roller pairs and successive rear roller pairs, it is also possible to cause the pallet surface to always be oriented substantially horizontally.

It follows that, according to this embodiment, a horizontally oriented pair of rails 450 will suffice to generate the vertical movement of the pallet surface for taking over and transferring the containers. In particular, the vertical movement of the pallet surface can flexibly be adapted by a control and/or regulating unit (not shown), so that e.g. the location of the comb-shaped inlet area of the second transfer platform at which the containers carried along are deposited can be varied in a flexible manner. In this way, a movability of the second transfer platform will not be necessary, while the containers can still be deposited close together on the transfer platform. The purposeful variation of the distance between successive roller pairs also allows an automatic adaptation of the container format by simply adjusting the path-time profiles, for example in the form of a type management of a programmable logic controller. Because of the possible horizontal arrangement of the pair of rails 450, the transfer conveyor of this embodiment is moreover particularly compact and less error-prone.

The embodiments described make it possible to take over one or a plurality of container lines from a first transfer platform in a targeted manner and without toppling, convey it/them along a conveying route, and transfer it/them to a second transfer platform again in a targeted manner and without toppling. In so doing, the individual path-time profiles of the transfer pallets of a long-stator linear motor drive can be used to allow a buffer function that is independent of the manipulators. The conveyance of the containers also includes grouping of the container lines on the second transfer platform. In addition, the containers are conveyed pressure-free and thus gently.

The invention claimed is:

1. A device for grouping containers, comprising:
a plurality of transfer pallets each configured for conveying at least one container upright on a pallet surface of the transfer pallets;
a first transfer device comprising a first transfer platform and an infeed manipulator configured to transfer containers from a feed conveyor onto the first transfer platform; and
a transfer conveyor, configured to move the transfer pallets individually and independently of one another along a closed conveying path,
wherein the pallet surface of each transfer pallet has a plurality of ridge-like elevations forming a support surface for the at least one container,
wherein the first transfer platform has a comb-shaped outlet area configured for allowing the ridge-like elevations of the pallet surface to pass through intermediate spaces of the comb-shaped outlet area for taking over the at least one container, and
wherein the first transfer device is arranged on the closed conveying path such that and the transfer conveyor and the plurality of transfer pallets are configured such that the ridge-like elevations of the pallet surface of the transfer pallets pass through the intermediate spaces of the comb-shaped outlet area, when the transfer pallets pass the first transfer platform.

2. The device according to claim 1, wherein the transfer conveyor and the plurality of transfer pallets are configured such that the pallet surface of the transfer pallets is oriented substantially horizontally when passing through the comb-shaped outlet area.

3. The device according to claim 2, wherein each transfer pallet comprises at least one front roller pair and one rear roller pair, which are supported on different pairs of rails of the closed conveying path, and wherein an arrangement of the front roller pair and of the rear roller pair relative to the pallet surface and relative to the pairs of rails is selected such that the pallet surface is oriented substantially horizontally when passing through the comb-shaped outlet area.

4. The device according to claim 3, wherein the pairs of rails have a vertically offset, parallel section, so as to allow the pallet surface to pass through the comb-shaped outlet area.

5. The device according to claim 4, wherein the pairs of rails are arranged such that they are vertically offset also in a section subsequent to passage of the pallet surface through the comb-shaped outlet area.

6. The device according to claim 4, wherein the pairs of rails are arranged such that they are additionally horizontally offset relative to one another.

7. The device according to claim 2, wherein each transfer pallet comprises at least two front roller pairs and/or at least two rear roller pairs, which are each supported on a pair of rails of the closed conveying path such that they are movable under individual control, wherein the transfer pallet is configured such that by changing a distance between successive front roller pairs and/or between successive rear roller pairs a position of the pallet surface relative to horizontal is changeable.

8. The device according to claim 7, wherein the at least two front roller pairs and/or at least two rear roller pairs are movable under individual control by means of the long-stator linear motor drive.

9. The device according to claim 1, wherein the transfer conveyor comprises for each transfer pallet at least one runner of a long-stator linear motor drive.

10. The device according to claim 1, further comprising a second transfer device with a second transfer platform having a comb-shaped inlet area,
wherein the comb-shaped inlet area is configured such that and arranged on the closed conveying path such that the ridge-like elevations of the pallet surface of the transfer pallets are capable of entering the intermediate spaces of the comb-shaped inlet area for transfer of the at least one container; and
wherein the transfer conveyor is configured such that the ridge-like elevations of the pallet surface of the transfer pallets move, when the transfer pallets pass the comb-shaped inlet area, down to a level below a surface of the second transfer platform for transfer of the at least one container.

11. The device according to claim 10, wherein at least the comb-shaped inlet area of the second transfer platform is configured such that it is displaceable in a direction of movement of the transfer pallets.

12. The device according to claim 10, wherein the second transfer device further comprises an outfeed manipulator configured for transferring containers in groups from the second transfer platform to a discharge conveyor.

13. The device according to claim 1, wherein the ridge-like elevations of the transfer pallets have a front and/or rear edge.

14. A method for using a device according to claim 1 for grouping containers, comprising:
transferring at least one container line from the feed conveyor to the first transfer platform by means of the infeed manipulator;
taking over the at least one container line from the first transfer platform by means of a transfer pallet of the plurality of transfer pallets in that the ridge-like elevations of the pallet surface pass through the comb-shaped outlet area of the first transfer platform, the at least one container line being taken over such that the container line is aligned at a front edge of the pallet surface; and transferring the at least one container line to a second transfer platform by means of the transfer pallet in that the ridge-like elevations of the pallet surface move downwards through a comb-shaped inlet area of the second transfer platform.

15. The method according to claim 14, further comprising a temporary buffering of a plurality of container lines by means of the plurality of transfer pallets of the transfer conveyor.

16. The device according to claim 1, wherein the transfer conveyor has a long-stator linear motor drive.

* * * * *